(12) United States Patent  (10) Patent No.: US 9,417,804 B2
Micheloni et al.  (45) Date of Patent: Aug. 16, 2016

(54) SYSTEM AND METHOD FOR MEMORY BLOCK POOL WEAR LEVELING

(71) Applicant: Microsemi Storage Solutions (US), Inc., Aliso Viejo, CA (US)

(72) Inventors: Rino Micheloni, Turate (IT); Alessia Marelli, Dalmine (IT); Luca Crippa, Busnago (IT)

(73) Assignee: Microsemi Storage Solutions (US), INC., Aliso Viejo, CA (US)

( * ) Notice: Subject to any disclaimer, the term of this patent is extended or adjusted under 35 U.S.C. 154(b) by 196 days.

(21) Appl. No.: 14/325,212

(22) Filed: Jul. 7, 2014

(65) Prior Publication Data

US 2016/0004458 A1    Jan. 7, 2016

(51) Int. Cl.
 *G06F 12/00* (2006.01)
 *G06F 3/06* (2006.01)

(52) U.S. Cl.
 CPC ............. *G06F 3/0616* (2013.01); *G06F 3/064* (2013.01); *G06F 3/0659* (2013.01); *G06F 3/0679* (2013.01); *G06F 12/00* (2013.01)

(58) Field of Classification Search
 CPC ....... G06F 12/00; G06F 3/0616; G06F 3/064; G06F 3/0659; G06F 3/0679
 USPC ......................................... 711/100, 103, 154
 See application file for complete search history.

(56) References Cited

U.S. PATENT DOCUMENTS

| | | | |
|---|---|---|---|
| 815,137 A | 3/1906 | Beecher | |
| 5,615,235 A | 3/1997 | Kakuishi et al. | |
| 5,732,092 A | 3/1998 | Shinohara | |
| 5,875,343 A | 2/1999 | Binford et al. | |
| 6,115,788 A | 9/2000 | Thowe | |
| 6,539,515 B1 | 3/2003 | Gong | |
| 6,633,856 B2 | 10/2003 | Richardson et al. | |
| 6,895,547 B2 | 5/2005 | Eleftheriou et al. | |
| 6,934,804 B2 | 8/2005 | Hashemi | |
| 6,976,194 B2 | 12/2005 | Cypher | |
| 6,976,197 B2 | 12/2005 | Faust et al. | |
| 7,206,992 B2 | 4/2007 | Xin et al. | |
| 7,209,527 B2 | 4/2007 | Smith et al. | |
| 7,237,183 B2 | 6/2007 | Xin | |
| 7,324,559 B2 | 1/2008 | McGibney | |
| 7,450,668 B2 | 11/2008 | Ghosh et al. | |
| 7,457,906 B2 | 11/2008 | Pettey et al. | |
| 7,484,158 B2 | 1/2009 | Sharon et al. | |
| 7,529,215 B2 | 5/2009 | Osterling | |
| 7,567,472 B2 | 7/2009 | Gatzemeier et al. | |
| 7,620,784 B2 | 11/2009 | Panabaker | |
| 7,694,047 B1 | 4/2010 | Alston | |

(Continued)

OTHER PUBLICATIONS

NVM Express, Revision 1.0; Intel Corporation; Mar. 1, 2011.
NVM Express, revision 1.0; Intel Corporation; pp. 103-106 and 110-114; Jul. 12, 2011.

*Primary Examiner* — Tuan Thai
(74) *Attorney, Agent, or Firm* — Glass & Associates; Kenneth Glass

(57) ABSTRACT

A system and method for memory block pool wear leveling in a nonvolatile memory device. An improved bit error rate for the nonvolatile memory system is attained by identifying a plurality of memory block pools of the nonvolatile memory system, identifying a relaxation time delay for each of the plurality of memory block pools and executing a predetermined number of program/erase cycles for each of the plurality of memory block pools based upon the relaxation time delay of the memory block pools.

21 Claims, 11 Drawing Sheets

(56) References Cited

U.S. PATENT DOCUMENTS

| | | |
|---|---|---|
| 7,708,195 B2 | 5/2010 | Yoshida et al. |
| 7,752,346 B2 | 7/2010 | Talayco et al. |
| 7,801,233 B1 | 9/2010 | Chow et al. |
| 7,860,930 B2 | 12/2010 | Freimuth et al. |
| 7,904,793 B2 | 3/2011 | Mokhlesi et al. |
| 7,937,641 B2 | 5/2011 | Amidi |
| 7,945,721 B1 | 5/2011 | Johnsen et al. |
| 7,958,430 B1 | 6/2011 | Kolokowsky et al. |
| 7,975,193 B2 | 7/2011 | Johnson |
| 8,094,508 B2 | 1/2012 | Gatzemeier et al. |
| 8,140,930 B1 | 3/2012 | Maru |
| 8,176,367 B2 | 5/2012 | Dreifus et al. |
| 8,219,894 B2 | 7/2012 | Au et al. |
| 8,223,745 B2 | 7/2012 | Johnsen et al. |
| 8,228,728 B1 | 7/2012 | Yang et al. |
| 8,244,946 B2 | 8/2012 | Gupta et al. |
| 8,245,112 B2 | 8/2012 | Hicken et al. |
| 8,245,117 B1 | 8/2012 | Wu |
| 8,254,112 B2 | 8/2012 | Yang et al. |
| 8,255,770 B2 | 8/2012 | Park et al. |
| 8,261,136 B2 | 9/2012 | D'Abreu et al. |
| 8,281,217 B2 | 10/2012 | Kim et al. |
| 8,281,227 B2 | 10/2012 | Inskeep et al. |
| 8,286,004 B2 | 10/2012 | Williams |
| 8,307,258 B2 | 11/2012 | Flynn et al. |
| 8,327,220 B2 | 12/2012 | Borchers et al. |
| 8,335,977 B2 | 12/2012 | Weingarten et al. |
| 8,341,502 B2 | 12/2012 | Steiner et al. |
| 8,359,522 B2 | 1/2013 | Gunnam et al. |
| 8,392,789 B2 | 3/2013 | Biscondi et al. |
| 8,402,201 B2 | 3/2013 | Flynn et al. |
| 8,418,023 B2 | 4/2013 | Gunnam et al. |
| 8,429,325 B1 | 4/2013 | Onufryk et al. |
| 8,429,497 B2 | 4/2013 | Tu et al. |
| 8,473,812 B2 | 6/2013 | Ramamoorthy et al. |
| 8,493,791 B2 | 7/2013 | Karakulak et al. |
| 8,504,885 B2 | 8/2013 | Haratsch et al. |
| 8,504,887 B1 | 8/2013 | Varnica et al. |
| 8,555,140 B2 | 10/2013 | Gunnam et al. |
| 8,621,318 B1 | 12/2013 | Micheloni et al. |
| 8,640,005 B2 | 1/2014 | Wilkerson et al. |
| 8,656,257 B1 | 2/2014 | Micheloni et al. |
| 8,694,849 B1 | 4/2014 | Micheloni et al. |
| 8,694,855 B1 | 4/2014 | Micheloni et al. |
| 8,707,122 B1 | 4/2014 | Micheloni et al. |
| 8,769,374 B2 | 7/2014 | Franceschini et al. |
| 8,775,913 B2 | 7/2014 | Haratsch et al. |
| 8,787,428 B2 | 7/2014 | Dai et al. |
| 8,856,622 B2 | 10/2014 | Ramamoorthy et al. |
| 8,917,734 B1 | 12/2014 | Brown |
| 8,924,824 B1 | 12/2014 | Lu |
| 8,958,247 B2 | 2/2015 | Asaoka et al. |
| 8,995,302 B1 | 3/2015 | Brown et al. |
| 9,025,495 B1 | 5/2015 | Onufryk et al. |
| 9,058,289 B2 | 6/2015 | Tai et al. |
| 2002/0181438 A1 | 12/2002 | McGibney |
| 2003/0033567 A1 | 2/2003 | Tamura et al. |
| 2003/0104788 A1 | 6/2003 | Kim |
| 2003/0225970 A1 | 12/2003 | Hashemi |
| 2004/0088636 A1 | 5/2004 | Cypher |
| 2004/0123230 A1 | 6/2004 | Lee et al. |
| 2004/0181735 A1 | 9/2004 | Xin |
| 2004/0234150 A1 | 11/2004 | Chang |
| 2004/0252791 A1 | 12/2004 | Shen et al. |
| 2004/0268015 A1 | 12/2004 | Pettey et al. |
| 2005/0010846 A1 | 1/2005 | Kikuchi et al. |
| 2005/0226355 A1 | 10/2005 | Kibune et al. |
| 2005/0248999 A1 | 11/2005 | Tamura et al. |
| 2005/0252791 A1 | 11/2005 | Pechtold et al. |
| 2005/0286511 A1 | 12/2005 | Johnsen et al. |
| 2006/0039370 A1 | 2/2006 | Rosen et al. |
| 2006/0050694 A1 | 3/2006 | Bury et al. |
| 2006/0126728 A1 | 6/2006 | Yu et al. |
| 2006/0206655 A1 | 9/2006 | Chappell et al. |
| 2006/0282603 A1 | 12/2006 | Onufryk et al. |
| 2007/0050688 A1 | 3/2007 | Thayer |
| 2007/0089031 A1 | 4/2007 | Huffman et al. |
| 2007/0118743 A1 | 5/2007 | Thornton et al. |
| 2007/0136628 A1 | 6/2007 | Doi et al. |
| 2007/0147489 A1 | 6/2007 | Sun et al. |
| 2007/0233939 A1* | 10/2007 | Kim ............... G06F 12/0246 711/103 |
| 2008/0005382 A1 | 1/2008 | Mimatsu |
| 2008/0016425 A1 | 1/2008 | Khan et al. |
| 2008/0229079 A1 | 9/2008 | Flynn et al. |
| 2008/0229164 A1 | 9/2008 | Tamura et al. |
| 2008/0256280 A1 | 10/2008 | Ma |
| 2008/0256292 A1 | 10/2008 | Flynn et al. |
| 2008/0267081 A1 | 10/2008 | Roeck |
| 2008/0276156 A1 | 11/2008 | Gunnam et al. |
| 2008/0320214 A1 | 12/2008 | Ma et al. |
| 2009/0067320 A1 | 3/2009 | Rosenberg et al. |
| 2009/0077302 A1 | 3/2009 | Fukuda |
| 2009/0164694 A1 | 6/2009 | Talayco et al. |
| 2009/0290441 A1 | 11/2009 | Gatzemeier et al. |
| 2009/0296798 A1 | 12/2009 | Banna et al. |
| 2009/0303788 A1 | 12/2009 | Roohparvar et al. |
| 2009/0327802 A1 | 12/2009 | Fukutomi et al. |
| 2010/0085076 A1 | 4/2010 | Danilin et al. |
| 2010/0162075 A1 | 6/2010 | Brannstrom et al. |
| 2010/0185808 A1 | 7/2010 | Yu et al. |
| 2010/0199149 A1 | 8/2010 | Weingarten et al. |
| 2010/0211737 A1 | 8/2010 | Flynn et al. |
| 2010/0211852 A1 | 8/2010 | Lee et al. |
| 2010/0226422 A1 | 9/2010 | Taubin et al. |
| 2010/0246664 A1 | 9/2010 | Citta et al. |
| 2010/0262979 A1 | 10/2010 | Borchers et al. |
| 2010/0293440 A1 | 11/2010 | Thatcher et al. |
| 2011/0055659 A1 | 3/2011 | Tu et al. |
| 2011/0066902 A1 | 3/2011 | Sharon et al. |
| 2011/0072331 A1 | 3/2011 | Sakaue et al. |
| 2011/0119553 A1 | 5/2011 | Gunnam et al. |
| 2011/0161678 A1 | 6/2011 | Niwa |
| 2011/0209031 A1 | 8/2011 | Kim et al. |
| 2011/0225341 A1 | 9/2011 | Satoh et al. |
| 2011/0246136 A1 | 10/2011 | Haratsch et al. |
| 2011/0246842 A1 | 10/2011 | Haratsch et al. |
| 2011/0246853 A1 | 10/2011 | Kim et al. |
| 2011/0296084 A1 | 12/2011 | Nango |
| 2012/0051144 A1 | 3/2012 | Weingarten et al. |
| 2012/0054413 A1 | 3/2012 | Brandt |
| 2012/0096192 A1 | 4/2012 | Tanaka et al. |
| 2012/0141139 A1 | 6/2012 | Bakhru et al. |
| 2012/0166690 A1 | 6/2012 | Regula |
| 2012/0311402 A1 | 12/2012 | Tseng et al. |
| 2013/0013983 A1 | 1/2013 | Livshitz et al. |
| 2013/0086451 A1 | 4/2013 | Grube et al. |
| 2013/0117616 A1 | 5/2013 | Tai et al. |
| 2013/0117640 A1 | 5/2013 | Tai et al. |
| 2013/0145235 A1 | 6/2013 | Alhussien et al. |
| 2013/0163327 A1 | 6/2013 | Karakulak et al. |
| 2013/0163328 A1 | 6/2013 | Karakulak et al. |
| 2013/0176779 A1 | 7/2013 | Chen et al. |
| 2013/0185598 A1 | 7/2013 | Haratsch et al. |
| 2013/0315252 A1 | 11/2013 | Emmadi et al. |
| 2013/0318422 A1 | 11/2013 | Weathers et al. |
| 2014/0040704 A1 | 2/2014 | Wu et al. |
| 2014/0053037 A1 | 2/2014 | Wang et al. |
| 2014/0068368 A1 | 3/2014 | Zhang et al. |
| 2014/0072056 A1 | 3/2014 | Fay |
| 2014/0085982 A1 | 3/2014 | Asaoka et al. |
| 2014/0181617 A1 | 6/2014 | Wu et al. |
| 2014/0185611 A1 | 7/2014 | Lie et al. |
| 2014/0198581 A1 | 7/2014 | Kim et al. |
| 2014/0281767 A1 | 9/2014 | Alhussien et al. |
| 2014/0281822 A1 | 9/2014 | Wu et al. |
| 2014/0281823 A1 | 9/2014 | Micheloni et al. |
| 2015/0149871 A1 | 5/2015 | Chen et al. |
| 2015/0186055 A1* | 7/2015 | Darragh ............... G06F 3/0616 711/103 |

\* cited by examiner

SYSTEM AND METHOD FOR MEMORY BLOCK POOL WEAR LEVELING

BACKGROUND

A solid state drive (SSD) is a data storage device that utilizes solid-state memory to retain data in nonvolatile memory chips. NAND-based flash memories are widely used as the solid-state memory storage in SSDs due to their compactness, low power consumption, low cost, high data throughput and reliability. SSDs commonly employ several NAND-based flash memory chips and a flash controller to manage the flash memory and to transfer data between the flash memory and a host computer. SSDs may be used in place of hard disk drives (HDDs) to provide higher performance and to reduce mechanical reliability issues. An SSD includes a high-speed interface connected to a controller chip and a plurality of storage, or memory, elements. The controller chip translates a high-speed protocol received over the high-speed interface into the protocol required by the storage elements, which include solid state memory devices, such as semiconductor devices. The controller controls the occurrence of read and erase (i.e. program/erase cycles, or P/E cycles) events in the storage elements.

The storage elements in the SSD are organized into a plurality of blocks, which are the smallest erasable units in the memory device. The blocks are subdivided into pages, which are the smallest readable units of the memory device and the pages are subdivided into sectors. In a P/E cycle, all the pages in a block are erased and then some, if not all, of the pages in the block are subsequently programmed.

An issue for SSDs is the reliability of the storage elements over the life of the SSD. Over time, relatively high gate voltages applied to the storage elements during P/E cycles in the SSD may cause cumulative permanent changes to the storage element characteristics. Charge may become trapped in the gate oxide of the storage elements through stress-induced leakage current (SILC). As the charge accumulates, the effect of programming or erasing a storage element becomes less reliable and the overall endurance of the storage element decreases. Additionally, an increasing number of P/E cycles experienced by a storage element decreases the storage element's data retention capacity, as high voltage stress causes charge to be lost from the storage element's floating gate.

Because the cells become unreliable as a result of numerous program and erase (P/E) cycles and that the number of cycles that a single cell can sustain is limited, there is a need to avoid stressing particular blocks of cells of the memory device. Techniques known as "wear leveling" have been developed to evenly spread the number of P/E cycles among all of the available memory blocks to avoid the overuse of specific blocks of cells, thereby extending the life of the device. The goal of wear leveling is to insure that no single block of cells prematurely fails as a result of a higher concentration of P/E cycles than the other blocks of the memory storage device. Conventional wear leveling techniques arrange data so that P/E cycles are evenly distributed among all of the blocks in the device. The effect of wear leveling is to minimize the time between two consecutive P/E cycles for all of the blocks of the memory storage device to extend the useful life of the device. In addition to extending the useful life of the device, it is also desirable to minimize the Bit Error Rate (BER) of the data storage device. However, experimental measurements show that conventional wear leveling techniques may not be effective in minimizing the (BER) of the data storage device.

Accordingly, what is needed in the art is a system and method for wear leveling which also minimizes the BER of the data storage device.

SUMMARY

In various embodiments, a nonvolatile memory system includes a nonvolatile memory storage module for storing encoded data. The nonvolatile memory storage module comprises a plurality of memory cells and the memory cells are controlled by a nonvolatile memory controller.

A method for memory block pool wear leveling in a nonvolatile memory system includes, identifying a plurality of memory block pools of the nonvolatile memory system, each of the memory block pools comprising a plurality of memory blocks and each of the plurality of memory blocks comprising a plurality of memory cells. The method further includes, identifying a relaxation time delay for each of the plurality of memory block pools, wherein the relaxation time delay for each of the plurality of memory block pools is identified as a duration of time between a completion of a programming cycle of the memory block pool and a point in time when the BER (bit error rate) of the memory block pool is at a minimum. Following the identification of the plurality of memory block pools and the associated relaxation time delay for each of the memory block pools, the method further includes, executing a predetermined number of program/erase cycles for each of the plurality of memory block pools based upon the relaxation time delay of each of the plurality of memory block pools.

A nonvolatile memory controller for memory block pool wear leveling in a nonvolatile memory system includes, a memory block pool wear leveling module configured for identifying a plurality of memory block pools of the nonvolatile memory device and for identifying a relaxation time delay for each of the plurality of memory block pools. The nonvolatile memory controller further includes, a program/erase module coupled to the memory block pool wear leveling module, the program/erase module configured for executing a predetermined number of program/erase cycles for each of the plurality of memory block pools based upon the relaxation time delay of each of the plurality of memory block pools.

The use of a relaxation time delay between active cycles in which program and erase operations are performed reduces BER and extends the lifetime of the nonvolatile memory system.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In the operation of a nonvolatile memory system, the storage elements of the memory system are subjected to many program/erase cycles over the lifetime of the device. Over time, the relatively high gate voltages applied to the storage elements during P/E cycles of the storage elements may cause cumulative permanent changes to the storage element characteristics. These cumulative changes to the storage element characteristics may cause a decrease in the reliability of the storage elements and a decrease in the overall endurance of the storage elements, thereby resulting in an undesirable increase in the bit error ratio (BER) of the memory system.

Figure 1:
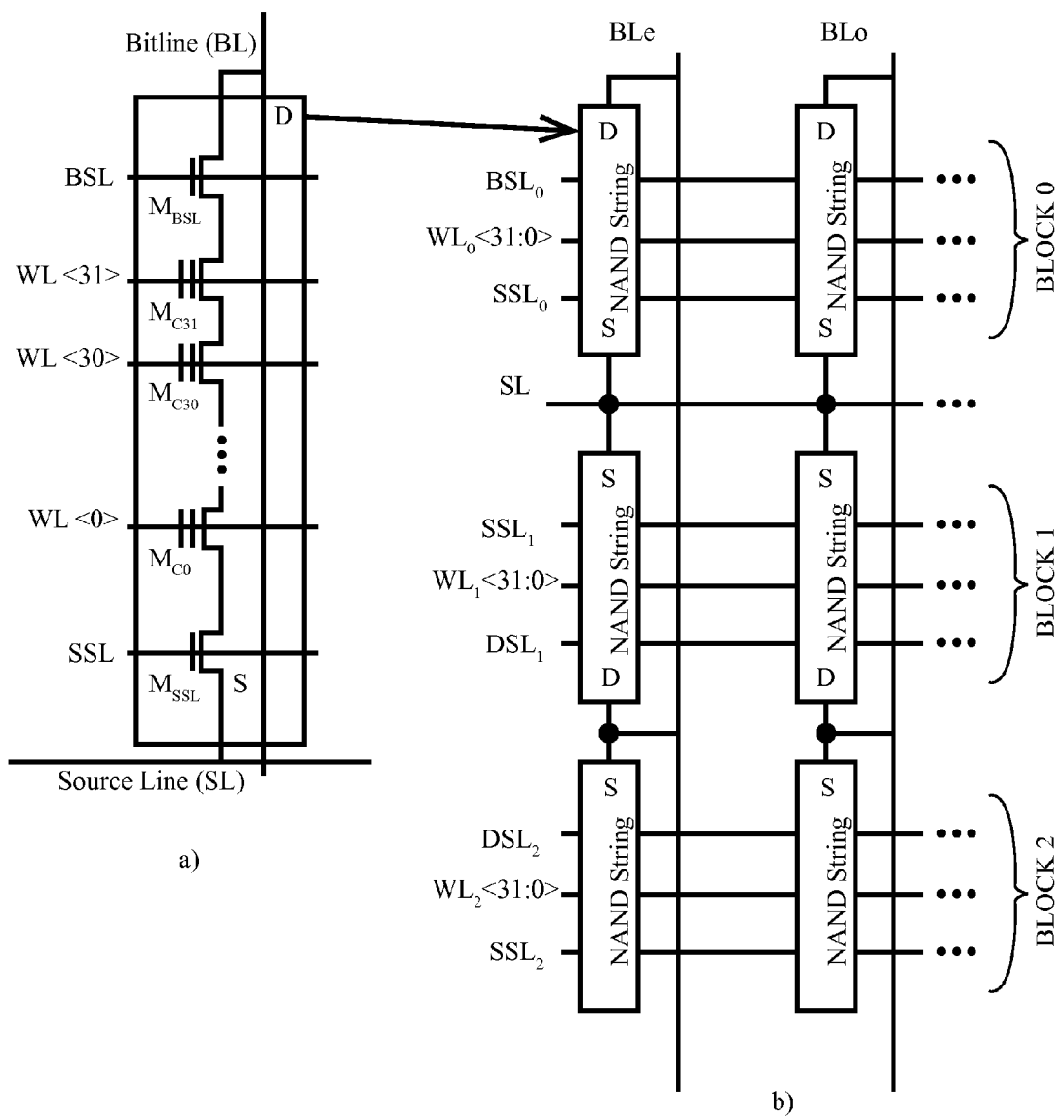
FIG. 1 is circuit diagram illustrating a NAND string and a NAND array in accordance with an embodiment of the present invention.

The nonvolatile memory system may be a NAND-based flash memory system. NAND flash memories are nonvolatile, and as such, are able to store and keep data even in the absence of a power source. With reference to FIG. 1, the basic elements of a flash memory are the nonvolatile memory cells, which are usually connected in series to form a string. Typically a string is composed of 32 or 64 cells in series. NAND string a) illustrates the case wherein 32 cells ($M_{C0}$ to $M_{C31}$) are connected in series. Two selection transistors are placed at the edge of the string of cells. Selection transistor $M_{SSL}$ ensures the connection to the source line, while selection transistor $M_{BSL}$ connects the string to the bitline (BL). The control gates of the cells are connected through the wordlines (WLs). NAND array b) illustrates how the matrix array of cells is built, beginning with a string. In the WL direction, adjacent NAND strings share the same WL, DSL, BSL and SL. In the BL direction, two consecutive strings share the BL contain NAND based memories, a flash block is composed of the NAND strings that share the same group of WLs. NAND array b) is shown to include three blocks, BLOCK0 that is made up of $WL_0$<31:0>, BLOCK1 that is made up of $WL_1$<31:0> and BLOCK2 that is made up of $WL_2$<31:0>.

In NAND based memories, a logical page is composed of cells belonging to the same WL. The number of pages per WL is related to the storage capability of the memory cell. Depending upon the number of storage levels, flash memories are referred to in different ways: SLC (single level cell) memories store 1 bit per cell, MLC (multi-level cell) memories store 2 bits per cell, 8LC (eight level cell or triple level cell) memories store 3 bits per cell and 16LC (sixteen level cell) memories store 4 bits per cell.

Considering the SLC case with interleaved architecture, wherein one page is composed of even cells and a second page is composed of odd cells, if the page size is 4 kB, it follows that a WL has 32,768+32,768=65,536 cells. In contrast, in the MLC case, there are four pages, as each cell stores one least significant bit (LSB) and one most significant bit (MSB).

In general, a logical page is the smallest addressable unit for reading from and writing to the NAND memory. The number of logical pages within a logical block is typically a multiple of 16 (e.g. 64, 128). Additionally, in a NAND based memory, a logical block is the smallest erasable unit.

Figure 2:
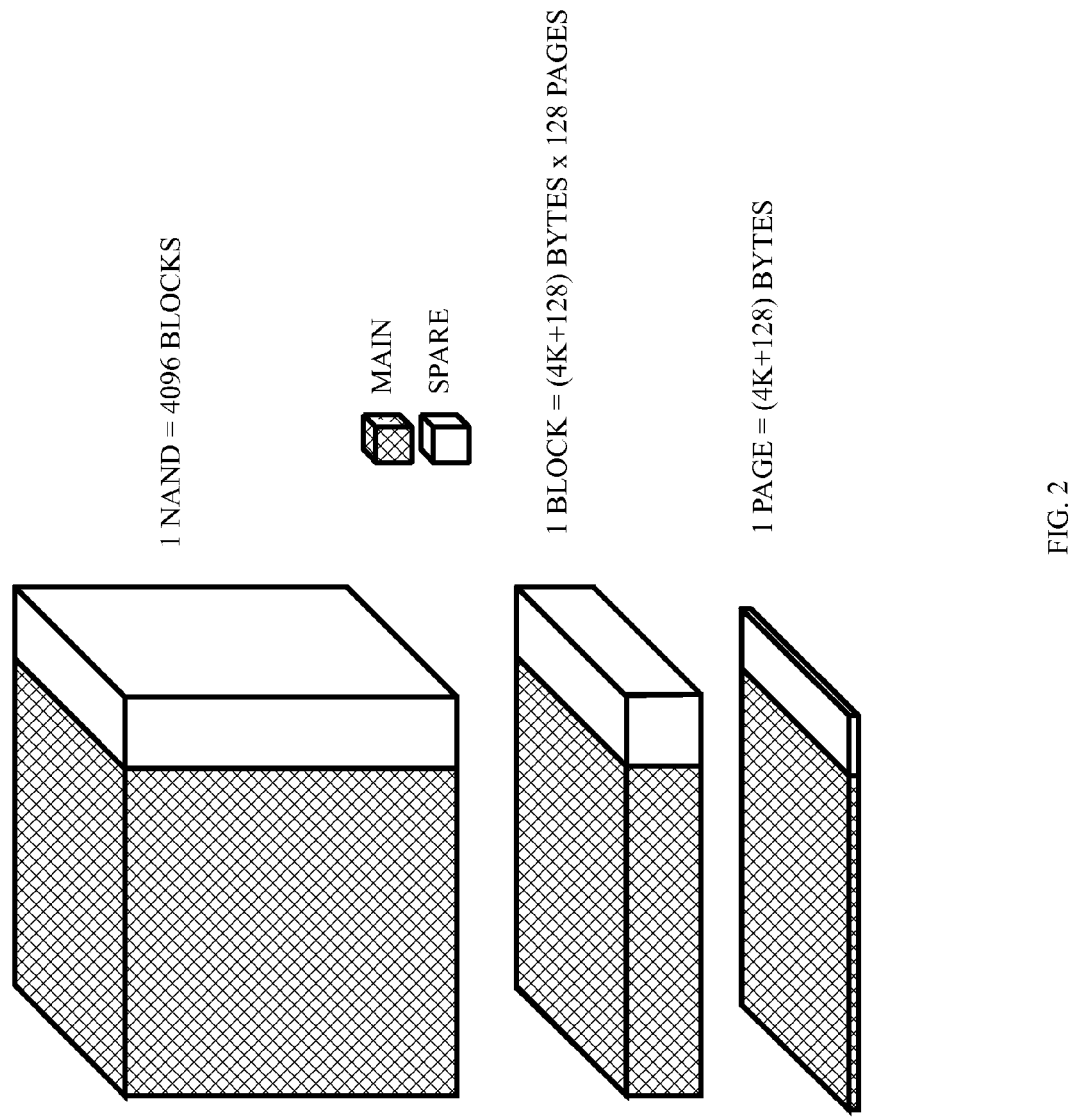
FIG. 2 is an illustration of a 16 GBit memory logic organization in accordance with an embodiment of the present invention.

As shown with reference to FIG. 2, each page of the NAND memory is composed of a main data area and a spare area. The main area may have the size of 4 kB, 8 kB or 16 kB. The spare area can be used to store error correction codes (ECC) and is made up of hundreds of bytes for every 4 kB of main data area. The logical organization shown in FIG. 2 is for an SLC device with a string of 64 cells, interleaving architecture and 4 kB page (plus 128 B of spare area per page). Each logical block contains 128 pages with a total of 512 kB per block. It follows that for a 4 GB (16 Gbit) memory, 4096 blocks are needed for storage.

NAND-based flash memories are based on the floating gate technology. In a typical floating gate technology, a MOS transistor is built with two overlapping gates, wherein the first gate is completely surrounded by oxide, while the second gate is contacted to form the gate terminal. The isolated gate creates an excellent "trap" for electrons, which guarantees the charge retention of the memory cell for years. In floating gate storage technologies, two logic states are achieved by altering the number of electrons within the floating gate to achieve two logic states (1 and 0). In order to change the logic states of the memory cells of NAND-based flash memories, a strong electric field is applied to the cells which results in the destruction of the charge storage characteristics of the memory cell and negatively effects the ability of the cell to store information after a certain number of program/erase cycles. The cumulative result of the numerous program/erase cycles of the memory cells is a corresponding undesirable increase in the BER of the memory storage device.

NAND-based flash memories are characterized by a fixed number of P/E cycles and generally, in order to uniformly distribute the P/E cycles over all the memory cell blocks of the device, a wear-leveling algorithm is applied. Each block of memory cells can tolerate a finite number of P/E cycles before becoming unreliable. For example, an SLC (single level cell) NAND-based flash memory is typically rated at about 100,000 P/E cycles. Wear-leveling techniques known in the art are designed to extend the life of the NAND-based flash memory device, thereby decreasing the BER of the device, by evenly distributing the P/E cycles over all of the memory blocks of the device. The objective of current wear-leveling techniques is to maximize the time between two consecutive P/E cycles for every block of cells of the memory device. As such, each block of cells is treated equally and the wear-leveling algorithms known in the art are designed to maximize the time between P/E cycle n and P/E cycle n+1 for every block of cells.

However, experimental measurements show that these common wear-leveling schemes that evenly distribute the P/E cycles over all of the memory blocks of the device by maximizing the time between two consecutive P/E cycles for every block of cells do not necessarily minimize the BER of the device.

A nonvolatile memory system 300 for performing memory block pool wear-leveling is illustrated with reference to FIG. 3. The nonvolatile memory system 300 includes a nonvolatile memory controller 310 in communication with a nonvolatile memory storage module 340. The nonvolatile memory storage module 340 includes a plurality of NAND chips 350 for storing data. The nonvolatile memory controller 310 includes a memory block pool wear leveling module 320 and a program/erase module 330 coupled to the memory block pool wear leveling module 320.

Figure 3:
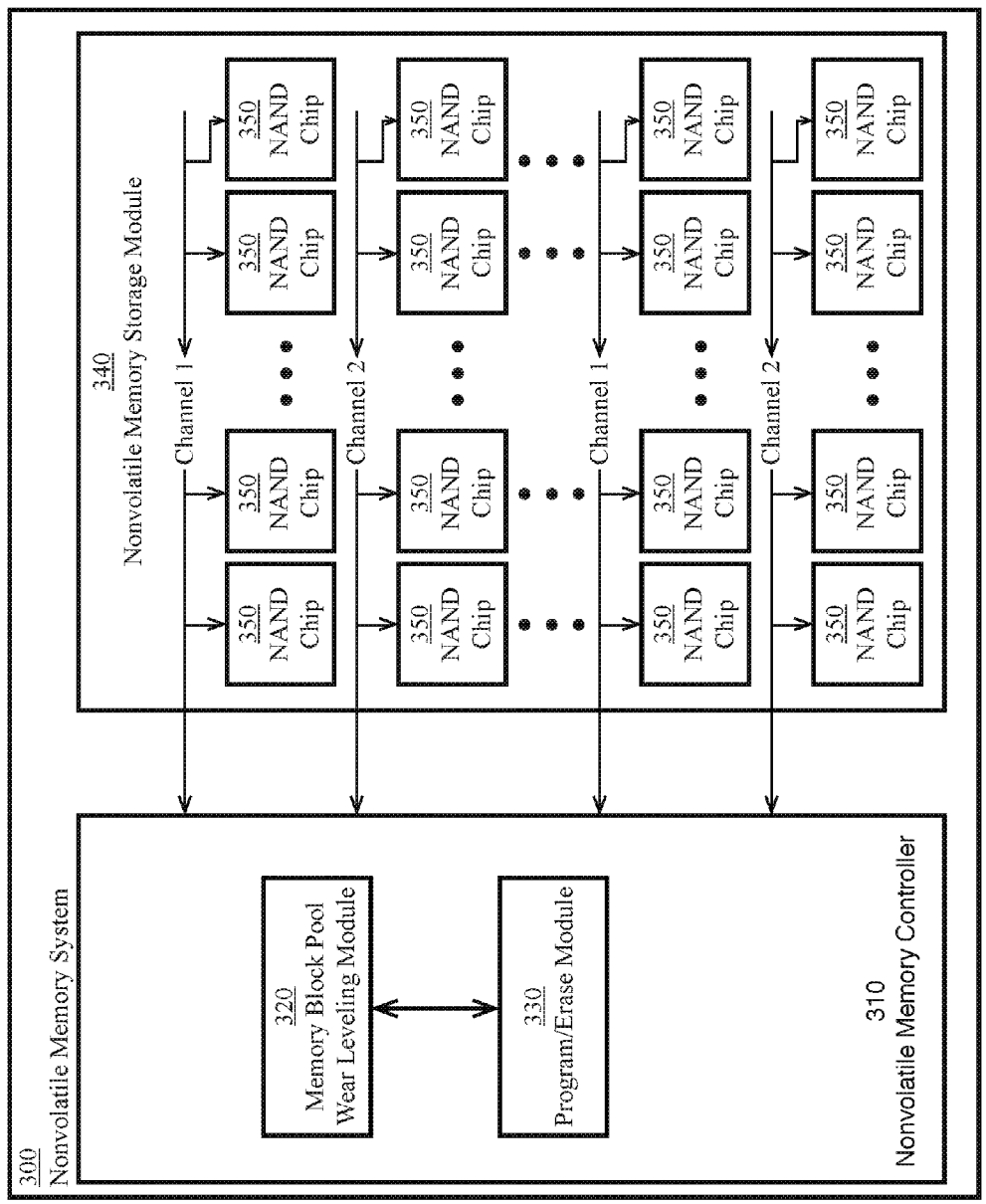
FIG. 3 is a block diagram illustrating a nonvolatile memory system in accordance with an embodiment of the present invention.
Figure 4:
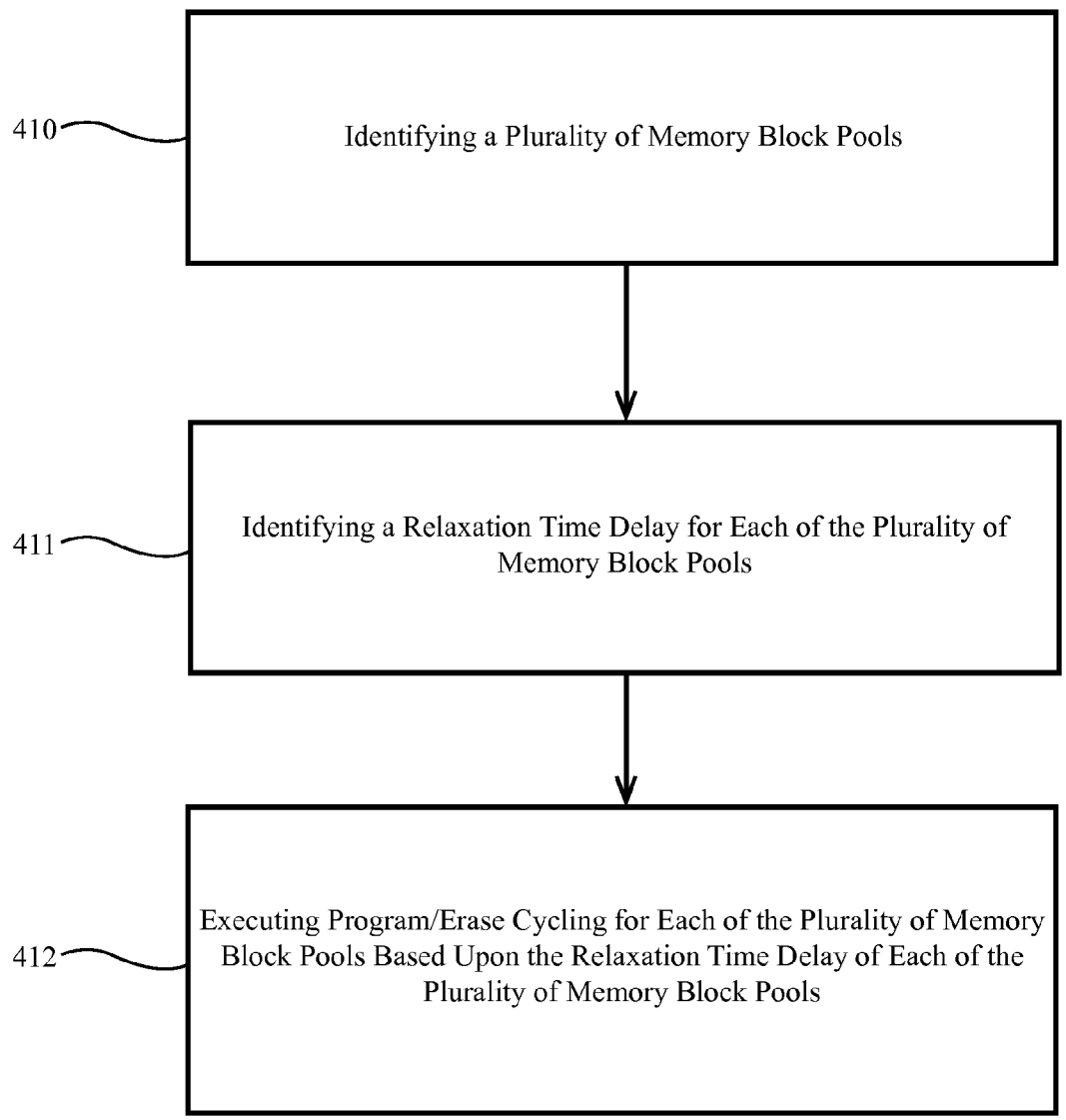
FIG. 4 is a flow diagram illustrating a method of memory block pool wear-leveling in accordance with the present invention.

With reference to FIG. 4, a method for memory block pool wear leveling in a nonvolatile memory system is described. The method begins as shown by step 410 by identifying a plurality of memory block pools of the nonvolatile memory device. Each of the memory block pools includes a plurality of memory blocks and each of the plurality of memory blocks includes a plurality of memory cells. In the embodiment shown in FIG. 3, memory block pool wear leveling module 320 is operable for identifying the memory block pools. More particularly, memory block pool wear leveling module 320 is configured for identifying a plurality of memory block pools of the nonvolatile memory device by identifying memory blocks from the nonvolatile memory storage module 340 to be included in each memory block pool. The memory block pools may be identified by the random selection of memory blocks or alternatively, the memory block pools may be identified by selecting memory blocks having a similar BER. Dividing the memory blocks randomly effectively averages the BER across all of the memory blocks because the BER of the blocks varies within a single memory device die and also from die-to-die. Alternatively, a scan of the blocks can be executed to determine the initial BER of the blocks and then the memory blocks can be grouped into memory block pools based upon their associated BER, such that memory blocks with similar BERs are identified as belonging to the same memory block pool. Alternatively, the memory blocks having higher BER may be spread among different memory block pools to uniformly spread the BER among the memory block pools. The memory block pool wear leveling module 320 may also modify the memory blocks within one or more of the memory block pools over the lifetime of the nonvolatile memory storage module.

After the memory block pools have been identified 410, the method continues by identifying a relaxation time delay for each of the plurality of memory block pools. In the present embodiment the relaxation time delay for each of the plurality of memory block pools is identified as a duration of time between a completion of a programming cycle of the memory block pool and a point in time when the BER (bit error rate) of the memory block pool is at a minimum. In one embodiment, identifying the relaxation time delay for each of the plurality of memory block pools 411 is performed by memory block pool wear leveling module 320. The relaxation time delay may be identified experimentally for each of the plurality of memory block pools. In one embodiment, the relaxation time delay for each of the plurality of memory block pools of the nonvolatile memory device may be substantially equivalent. In an additional embodiment the relaxation time delay may different for one or more of the memory block pools.

Experimental results may indicate that the relaxation time delay should be adjusted during the lifetime of the device to minimize the BER. In this case, memory block pool wear leveling module 320 is operable to either use different relaxation time delays that are stored in nonvolatile memory system 300 or to retest NAND chips 350 for determining the adjusted relaxation time delay.

Figure 5:
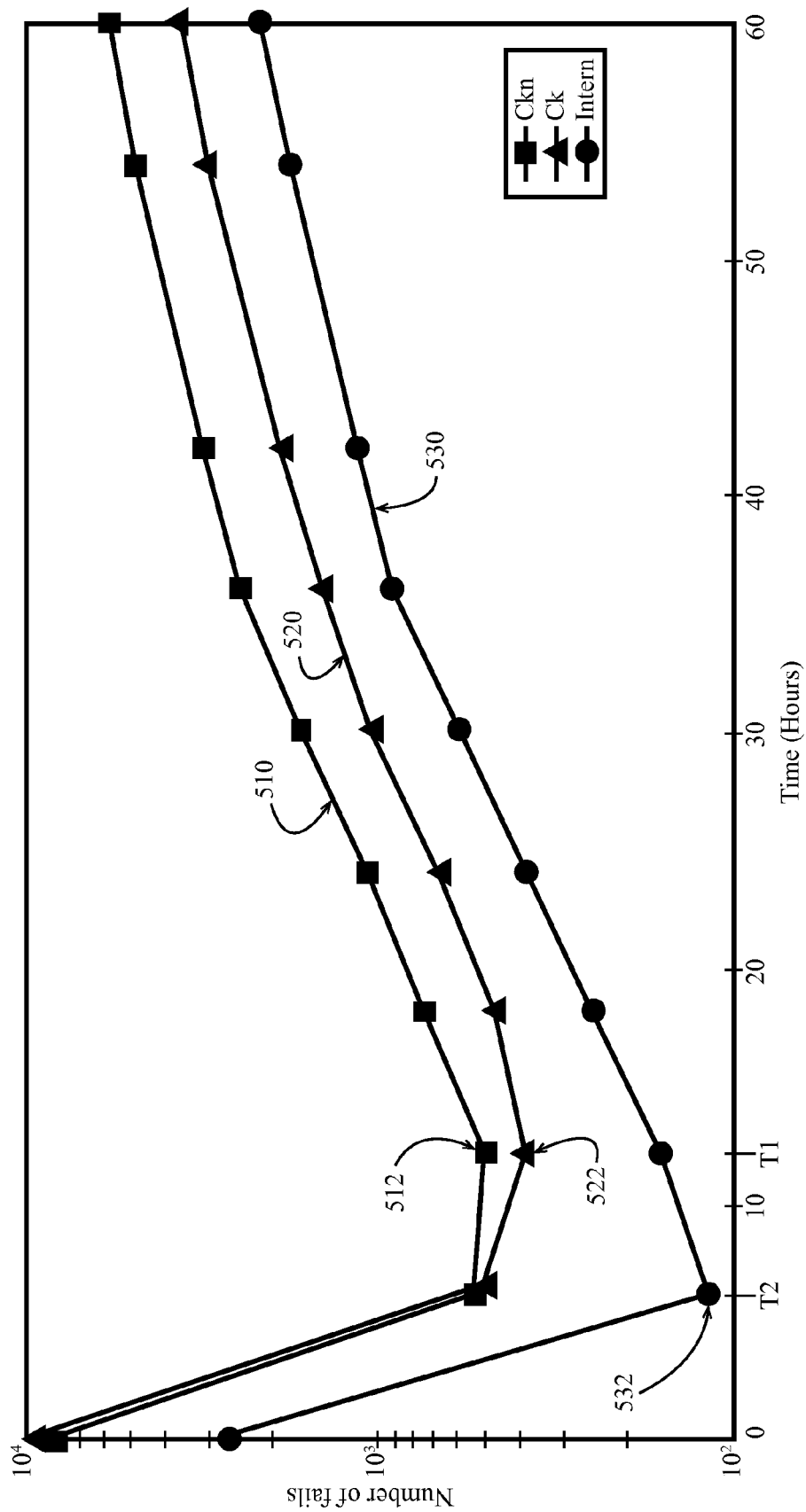
FIG. 5 is a graphical illustration of the number of failures relative to data retention in a single level cell distribution in a NAND cell in accordance with an embodiment of the invention.

FIG. 5 illustrates determining relaxation time delay in accordance with an embodiment of the present invention using experimentally measured data for a typical NAND-based SLC (1-bit per cell) device having three different data patterns stored in the flash memory pages (Ck, Ckn and Intern) at a temperature of 90 C. The BER of a NAND-based device is a function of the data pattern that is stored inside the pages of the device as a result of the parasitic coupling of the cells of the device. As such, each of the data patterns results in a slightly different BER for the memory device. As illustrated in FIG. 5, a first stored data pattern (Ckn) 510, a second stored data pattern (Ck) 520 and a third stored data pattern (Intern) 530 each result in a different number of fails (BER) over the duration of time that the data is stored in the device. For each of the illustrated data patterns 510, 520, 530, the data is initially programmed into the device at time 0 hours. Programming errors are known to occur during the programming of the device as a result of the parasitic coupling effect. Programming errors occur during each P/E cycle of the memory storage device and the programming errors contribute to the BER of the memory device during the device lifetime. After the device is programmed, the device enters into a retention phase, during which time the data is stored in the memory device.

As a result of the charge leakage of the cells over time, retention errors that occur as a result of data retention tends to shift the voltage threshold distribution of the cells such that it is more likely that a logic state of "0" (programmed) becomes a logic state of "1" (erased) and corresponding it is less likely that a logic state of "1" (erased) becomes a logic state of "0" (programmed). In contrast, it is known that the programming errors that occur as a result of the programming operation of the P/E cycling of the memory cells tends to shift the voltage threshold distribution of the cells in the opposite direction, such that it is more likely that a logic state of "1" (erased) becomes a logic state of "0" (programmed) and correspondingly, it is less likely that a logic state of "0" (programmed) becomes a logic state of "1" (programmed). As such, while both P/E cycling and data retention contribute to the BER, for P/E cycling it is more likely that an erased cell will become a programmed cell than it is that a programmed cell will become an erased cell, whereas as the duration of time the data is stored increases, it is more likely that a programmed cell will become an erased cell than it is that an erased cell will become a programmed cell.

While in this exemplary embodiment, a logic state of "0" is representative of a programmed state and a logic state of "1" is representative of an erased state, in an alternative embodiment, a logic state of "1" may be representative of a programmed state and a logic state of "0" may be representative of an erased state.

FIG. 5 illustrates the combined effect on the BER of both the transitions from a programmed state to an erased state and from an erased state to a programmed state during the retention phase of the cells. Following the initial programming of the memory cells the data is read and the total number of failures is computed to obtain the first error measurements (time=0) on curves 510, 520 and 530 that can be referred to as programming errors. The majority of the programming errors resulting from the programming of the memory cells of the device occur as a result of a cell being inadvertently programmed to a logic state of "0" when it is intended that the cell store an erased logic state of "1". Following the programming of the cells, the device enters into a retention phase, wherein some of the cells of the device begin to lose charge due to the effects of leakage current, resulting in retention errors. The majority of the retention errors, resulting from the cells loss of charge, occur as a result of a cell experiencing a transition from a programmed logic state of "0" to an erased logic state of "1". As a result of the retention errors, some of the cells that were inadvertently programmed to a logic state of "0" experience of loss of charge and are "corrected" during the retention phase wherein the logic state of the cell is transitioned from a logic state of "0" to the intended logic state of "1", as a result of the leakage current and associated dissipation of charge within the cell. In general, the retention errors counteract the programming errors and as a result, some of the programming errors are essentially corrected by the effect of the retention errors. Accordingly, the decrease in the BER at the beginning of the retention phase is attributed to the correction of one programming errors within the device as a result of the effect of the retention errors. However, the effect of the retention errors in decreasing the BER does not continue during the entire retention phase of the memory cells.

As shown in the graph of FIG. 5, after the initial decline in the BER, the number of failures (errors) increases and the corresponding BER increases as the retention time increases. As previously described, the failures are a result of both the transition of cells from a programmed state to an erased state and from an erased state to a programmed state. Following the initial decrease in the BER, wherein the retention errors are effective in correcting some of the programming errors, the number of retention errors continues to increase during the retention phase of the memory device, along with the corresponding BER.

In one embodiment the identified relaxation time delay is determined to be the retention time corresponding to the lowest number of failures (lowest BER) for one or more stored data patterns. In the embodiment shown in FIG. 5, the minimum number of fails for the Ckn pattern is represented by point 512, the minimum number of fails for the Ck pattern is represented by point 522 and the minimum number of fails for the Intern pattern is represented by point 532. Thus the identified relaxation time delay in step 411 can be, for example, the time T1 that corresponds to the minimum number of failures 512 for the Ckn pattern and the minimum number of failures 522 for the Ck pattern, which is 12 hours. The identified relaxation time delay in step 411 can also be, for example, the time T2 that corresponds to the minimum number of failures 532 for the Intern pattern, which is 7 hours.

Figure 6:
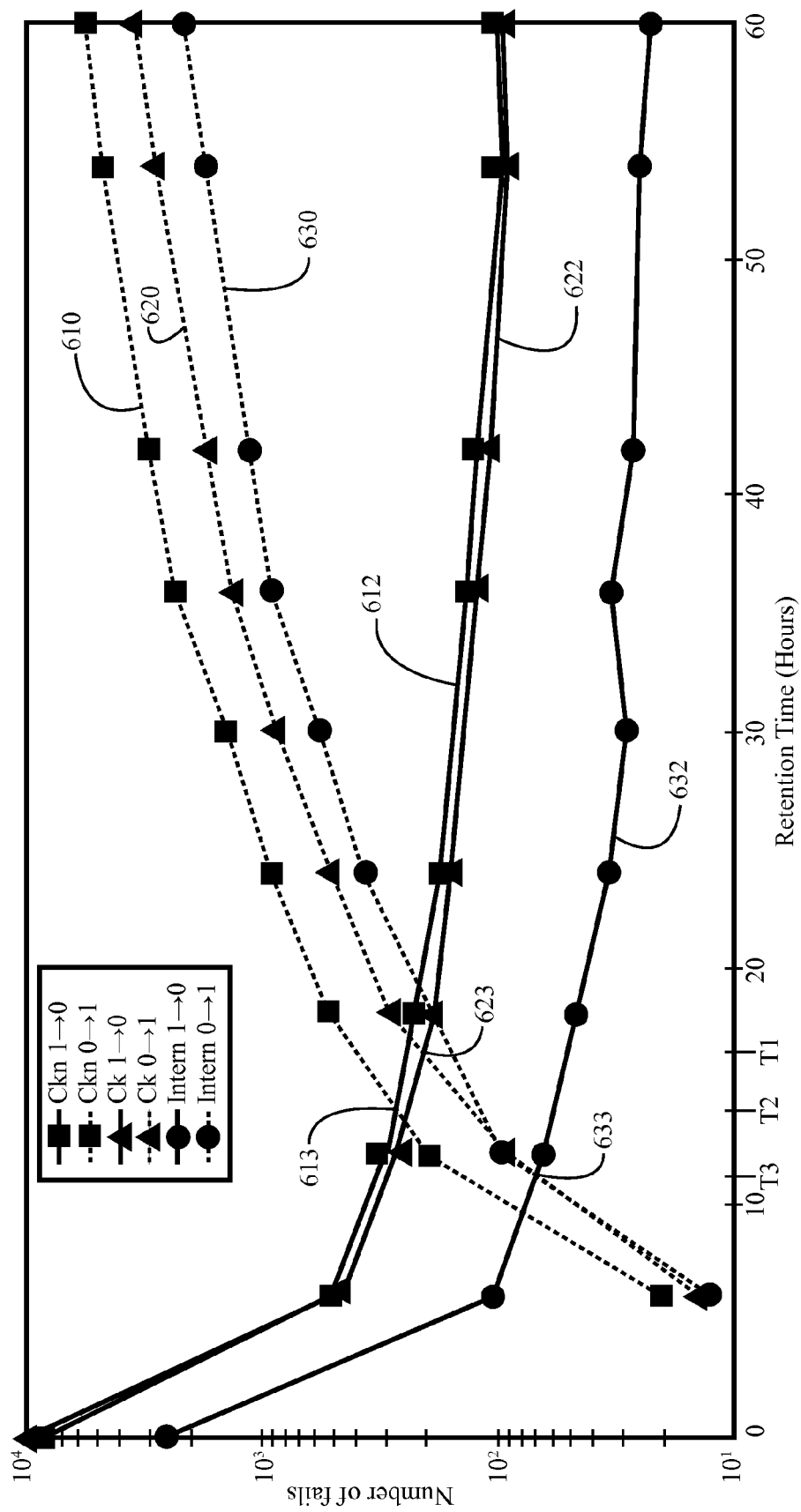
FIG. 6 is a graphical illustration of the number of failures relative to data retention in a single level cell distribution in a NAND cell that illustrates the contributions of the different state transitions to the BER in accordance with an embodiment of the invention.

In another embodiment that is illustrated in FIG. 6, instead of using the lowest total BER as shown in FIG. 5, the individual contributions of the cell transitions to the number of failures are used to identify the relaxation time delay in step 411. FIG. 6 illustrates the number of failures relative to data retention time for a SLC NAND-based device, wherein a first set of curves shows the results of a cell transition from a logical "1" to a logical "0" and a second set of curves shows the results of a cell transition from a logical "0" to a logical "1", for each of the stored data patterns. As previously described, the transition of a cell from a logical "1" to a logical "0" is attributed to programming errors and the transition of a cell from a logical "0" to a logical "1" is attributed to retention errors. The dashed curves, that may be referred to as program to erase (P-E) error curves, illustrate the number of failures duration the retention time that are a result of the transition of the cells from a logical "0" to a logical "1", or from a programmed state to an erased state, for each of the first stored data pattern (Ckn) 610, second stored data pattern (Ck) 620 and third stored data pattern (Intern) 630. The solid curves, that may be referred to hereinafter as erase to program (E-P) error curves, illustrate the number of failures duration the retention time that are a result of the transition of the cells from a logical "1" to a logical "0", or from an erased state to a programmed state, for each of the first stored data pattern (Ckn) 612, second stored data pattern (Ck) 622 and third stored data pattern (Intern) 632.

As shown in the graph of FIG. 6, the E-P error curves are decreasing and the associated number of fails (BER) is also decreasing. This decrease in the transition of cells from a logical "1" to a logical "0" indicates that the programming errors resulting from the programming of the cells are being corrected by the retention errors during the relaxation phase. In addition, while the P-E error curves are increasing as a result of the disruptive effect of the increasing retention errors, the increase in the BER attributed to the retention errors has not caused the overall BER to increase until such time that the P-E error curve and the E-P error curve cross. The time period from the initial programming to the point at which the two curves cross is referred to as the relaxation phase. At the point at which the two curves cross, the relaxation phase ends. At this point, the relaxation generates a minimum number of errors (minimum BER). Thus, the end of the relaxation phase and the minimum number of errors (minimum BER) for the first stored data pattern will be at the intersection 613 of the P-E error curve 610, and the E-P error curve 612 that corresponds to a retention time T2 of approximately 14 hours. The end of the relaxation phase and the minimum number of errors (minimum BER) for the second stored data pattern will be at the intersection 623 of the P-E error curve 620, and the E-P error curve 622 that corresponds to a retention time T1 of approximately 16 hours. The end of the relaxation phase and the minimum number of errors (minimum BER) for the third stored data pattern will be at the intersection 633 of the P-E error curve 630, and the E-P error curve 632 that corresponds to a retention time T3 of approximately 11 hours. The retention times T1, T2 and T3 corresponding to the end of the relaxation phase and the minimum number of errors (minimum BER) for each of the stored data patterns may be averaged to determine a relaxation time delay for the device, or alternatively, one of the retention times T1, T2 or T3 may be selected as the relaxation time delay for the device.

Accordingly, when program errors and retention errors are used to calculate the retention time corresponding to the minimum BER, the retention time corresponding to the end of the relaxation phase and the minimum BER can be defined as the time at which data retention has resulted in the transition of the same number of cells from an erased state to a programmed state as have transitioned from a programmed state to an erased state for a data test pattern. Thus, the relaxation time delay will be the retention time at which data retention has resulted in the transition of the same number of cells from an erased state to a programmed state as have transitioned from a programmed state to an erased state for a data test pattern. In another embodiment, the relaxation time delay is a time that is within the relaxation phase and that is at or near the end of the relaxation phase. As can be seen from the graph, most of the benefit of relaxation is achieved during the first sixty percent of the relaxation phase. Accordingly, in one embodiment the relaxation time delay is within the relaxation phase and within the last forty percent of the relaxation phase (e.g., for T3 of 11 hrs. the relaxation time delay would be less than or equal to 11 hours and greater than 5.6 hours).

As illustrated with respect to FIGS. 5-6, determining the relaxation time that provides the minimum BER can be difficult and will depend on the pattern used and other testing parameters. Accordingly, in one embodiment of the present invention the relaxation time delay is determined to be within the range of numbers that correspond to different calculations of relaxation time that correspond to a minimum number of errors (this will also be the minimum BER). In one embodiment this is based on total errors by calculating the retention time corresponding to a minimum BER 512, 522, 532 for each of a plurality of different data patterns that are representative of the operation of the nonvolatile memory device 300, as shown in FIG. 5, with the relaxation time delay determined to be a number that is less than or equal to the highest retention time corresponding to a minimum BER 512, 522 which is 12 hours (T1) and greater than or equal to the lowest retention time corresponding to a minimum BER 532 which is 7 hours (T2). In the present embodiment, this would mean that the relaxation time delay would be less than or equal to 12 hours and greater than or equal to 7 hours.

In another embodiment relaxation time delay is based on a range of numbers that correspond to a minimum BER calculated on a component level as illustrated in FIG. 6. In one embodiment this is based on retention error curves and program error curves by calculating the retention time corresponding to a minimum BER for each of a plurality of different data patterns (e.g., retention times corresponding to minimum BER values 613, 623, 633), with the relaxation time delay determined to be a number that is less than or equal to the highest retention time 613 (16 hrs.) of the retention times corresponding to minimum BER values, and greater than or equal to the lowest retention time 633 (11 hrs.) of the retention times corresponding to minimum BER values. In the present embodiment, this would mean that the relaxation time delay would be less than or equal to 16 hours and greater than or equal to 11 hours.

In one embodiment relaxation time delay for each of the plurality of memory block pools is determined experimentally and is stored in nonvolatile memory controller 310 prior to assembly of nonvolatile memory system 300; and nonvolatile memory controller 310 is programmable such that each vendor can change the stored relaxation time delay value to conform to the characteristics of NAND chips 350.

Alternatively, at initial start-up of nonvolatile memory system 300 memory block pool wear leveling module 320 is operable to test the memory blocks of each memory block pool identified in step 410 to determine the relaxation time delay. This test may be a test that programs one or more pattern into the memory blocks of each data pool, reads the memory blocks, and determines errors during the retention time of the test. The test may determine the total number of failures and take the time associated with the minimum total number of failures as the relaxation time delay as is illustrated in FIG. 5. Alternatively, the test may determine individual state transitions as is illustrated in FIG. 6, waiting until one or more of the curves for the one or more pattern converge, and using the retention time corresponding to the one or more point of convergence (e.g., retention times 613, 623, 633) as the relaxation time delay in step 411.

Following the identification of the relaxation time delay for each of the plurality of memory block pools 411, the method continues by executing a predetermined number of program/erase cycles for each of the plurality of memory block pools based upon the relaxation time delay of each of the plurality of memory block pools 412.

In one embodiment, executing a predetermined number of program/erase cycles for each of the plurality of memory block pools based upon the relaxation time delay of each of the plurality of memory block pools is performed by a program/erase module 330 of the nonvolatile memory controller 310. More particularly, program/erase module 330 is configured for executing a predetermined number of program/erase cycles for each of the plurality of memory block pools based upon the relaxation time delay of each of the plurality of memory block pools identified by the memory block pool wear leveling module 320.

The predetermined number of program/erase cycles for each of the plurality of memory block pools may be experimentally determined and the predetermined number of program/erase cycles for each of the plurality of memory block pools may be substantially equivalent or may be different.

In one embodiment the number of program and erase cycles to be used in each cycle of step 412 is determined experimentally and is stored in nonvolatile memory controller 310 prior to assembly of nonvolatile memory system 300; and nonvolatile memory controller 310 is programmable such that memory system vendors can change the predetermined number of P/E cycles in each set of program and erase cycles to conform to the characteristics of NAND chips 350.

Figure 9:
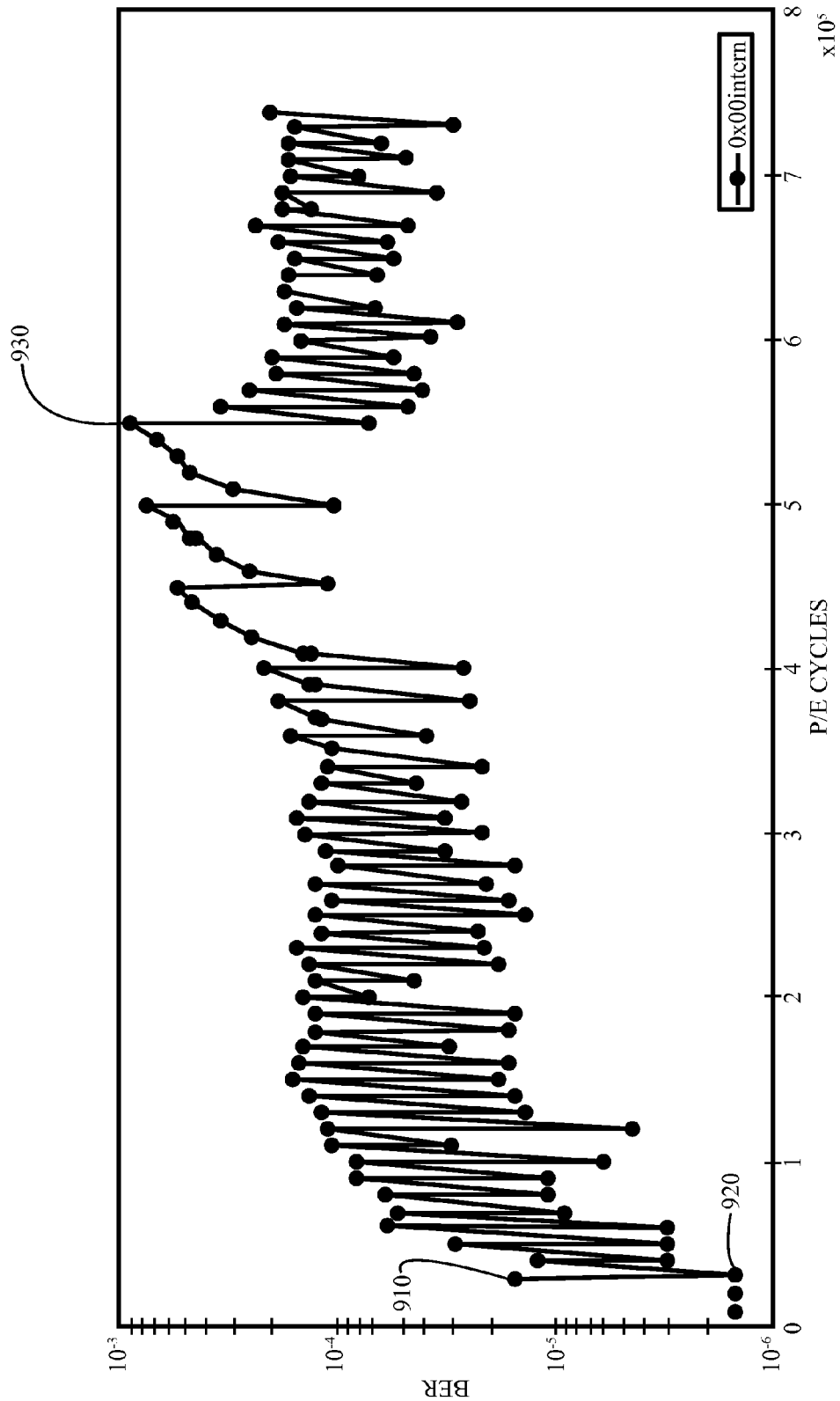
FIG. 9 is a graphical illustration of BER relative to P/E cycling that illustrates bit error rates for different numbers of P/E cycles performed prior to a relaxation time delay in accordance with an embodiment of the invention.

FIG. 9 illustrates a test that is performed to determine the number of P/E cycles to use in step 412. FIG. 9 shows BER evolution as a function of the number of P/E cycles performed following each relaxation delay, for an exemplary nonvolatile memory storage device programmed with a 0x00 intern pattern. At the beginning of the experiment, a relaxation delay is inserted between every 10K P/E cycles of the active memory block pool and the resulting BER of the active memory block pool is measured both before and after the 10K P/E cycles. The upper circles on the graph, beginning with upper circle 910 reflect the BER just after the 10K P/E cycles of the active memory block pool have been executed, while the lower circles (e.g., circle 920) reflect the BER after the relaxation delay of the memory block pool has been observed. The testing is performed at room temperature until about 200K P/E cycles, at which time each group of P/E cycles is followed by a bake (e.g., a 1 hr, 25 minute bake at 110 degrees C.). Beginning at about 35K P/E cycles, the parameters of the experiment are altered such that there are 20K P/E cycles executed between every relaxation delay. Again, the upper circles on the graph reflect the BER just after the 20 P/E cycles of the active memory block pool have been executed, while the lower circles reflect the BER after the relaxation time delay of the memory block pool. As is shown by the graph, as the number of executed P/E cycles for the memory block pool during the active state increases (from 10K to 20K), the BER also increases. Beginning at 40K P/E cycles, the parameters are again adjusted such that 50K P/E cycles of the active memory block pool are executed between each relaxation delay. As is shown by the graph, as the number of executed P/E cycles for the memory block pool during the active state increases from 10K to 20K and then to 50K, the bit error rate also increases. As such, for this specific technology, the experimental data shows that inserting a relaxation delay every 10K P/E cycles instead of every 20K or 50K will result a desirable lower BER. At 930 the parameters are modified back to inserting a relaxation delay every 10K P/E cycles. While the BER resulting from the execution of 50K P/E cycles between each relaxation delay is high, modifying the parameters such that 10K P/E cycles are executed after each relaxation time is shown to lower the BER and return the BER to a level similar to that prior to the 50K P/E cycle execution phase. While modern NAND SLC devices are typically specified up to 600K P/E cycles, as shown in the graph, following an initial ramp-up of the BER, the BER flattens and continues to be relatively flat even at very high P/E cycles as shown by the experimental results between 700K P/E cycles and 750K P/E cycles when the method of the present invention is employed. With the present invention, while the P/E cycles executed by the NAND device result in the accumulation of programming errors over the lifetime of the device, the introduction of a relaxation time between the active programming cycles of the device lowers the BER of the device following each active programming cycle, resulting in a lower BER over the lifetime of the device.

Figure 8:
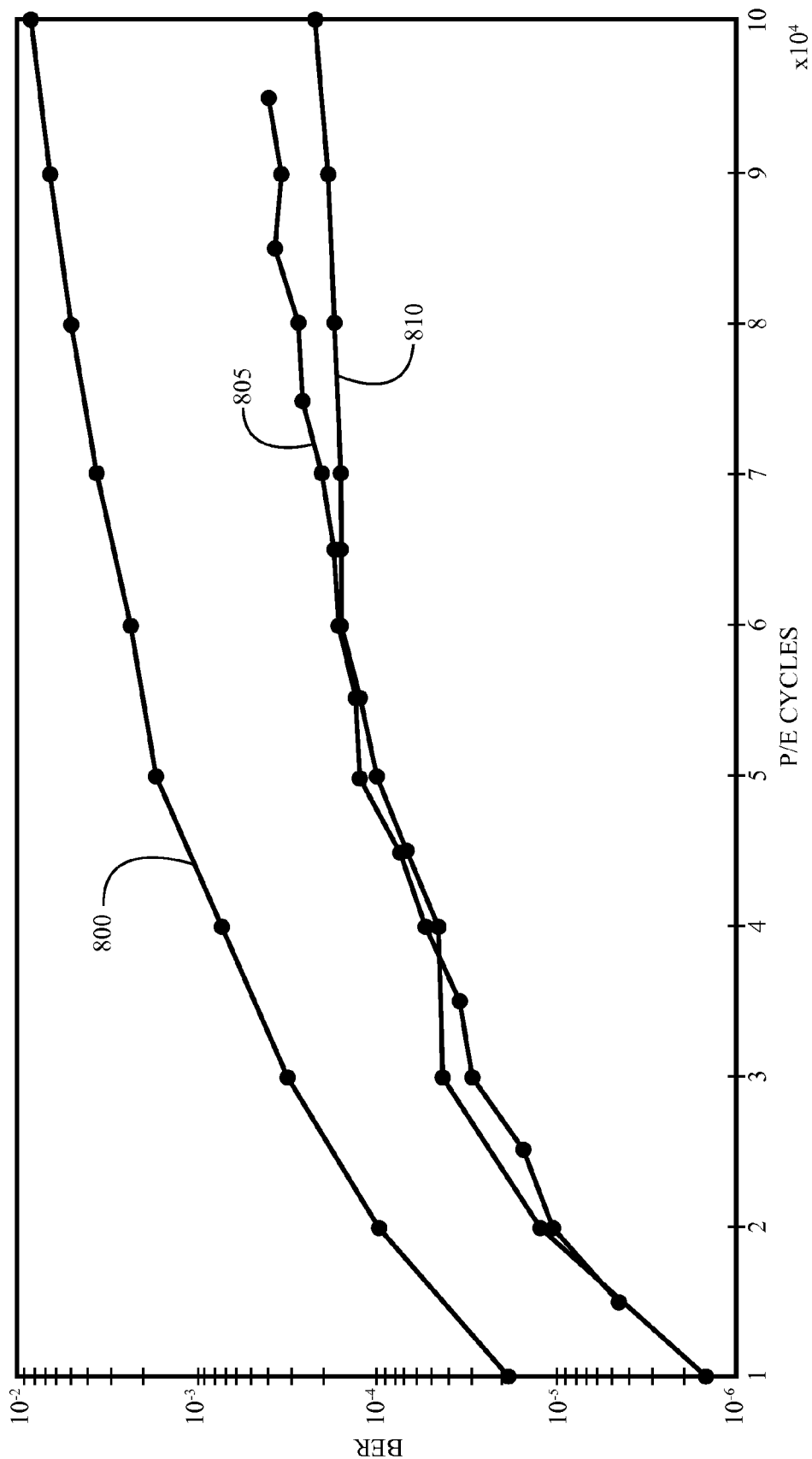
FIG. 8 is a graphical illustration of the changing BER relative to P/E cycling in accordance with an embodiment of the invention.

In the embodiment shown in FIG. 8, the use of 10,000 program and erase cycles is shown to provide the desired results. Accordingly, in one embodiment, step 412 includes performing P/E cycling using sets of 10K program and erase cycles.

In the present embodiment, the method includes evenly distributing the execution of the predetermined number of program/erase cycles among the plurality of blocks of the memory block pool during the active cycle of the pool. This distribution may use conventional wear leveling techniques.

Executing a predetermined number of program/erase cycles for each of the plurality of memory block pools based upon the relaxation time delay of each of the plurality of memory block pools may be performed at a maximum program/erase cycling rate. Alternatively, program/erase cycles are interrupted by read operations when read operations are to be performed on one or more page in a memory pool that is undergoing P/E cycling.

Figure 7:
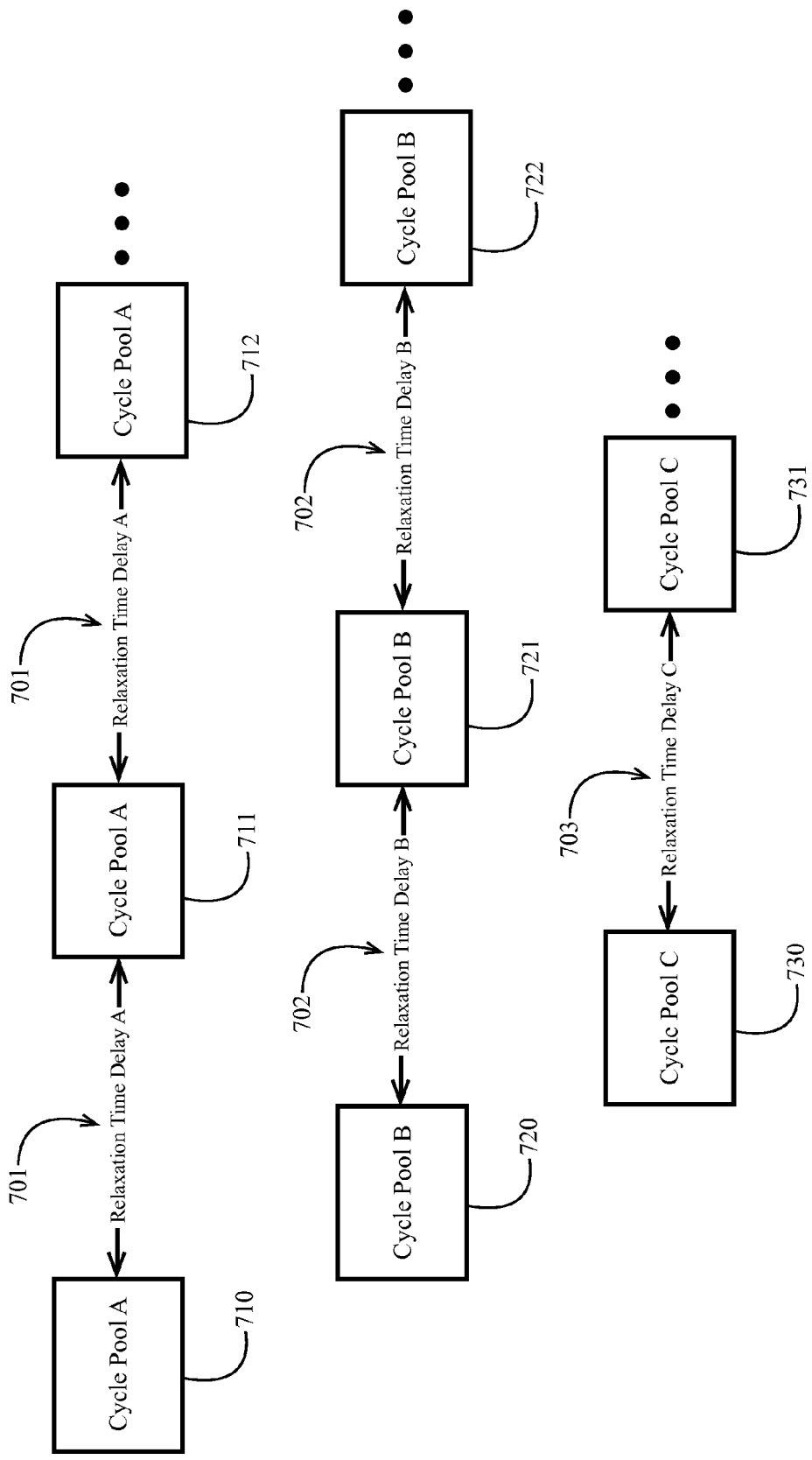
FIG. 7 is a block diagram illustrating memory block pools and relaxation time delay in accordance with an embodiment of the invention.

FIG. 7 illustrates an exemplary embodiment of the present invention in which the memory blocks are identified as belonging to either Pool A, Pool B or Pool C in step 410. The relaxation time delay for each of the memory block pools identified in step 411 may be determined experimentally as previously described by determining when the BER is at a minimum following the completion of a programming cycle. In a particular embodiment, the relaxation time delay for each of the memory block pools A-C may be determined experimentally by determining the intersection of the curves representing the two logical state transitions for each of the memory block pools. The relaxation time delay 701 for Pool A (Relaxation Time Delay A) may be equal to the relaxation time delay 702 for Pool B (Relaxation Time Delay B) and the relaxation time delay 703 for pool C (Relaxation Time Delay C), or the relaxation time delays may be different.

Continuing with FIG. 7, the NAND memory blocks of Pool A execute a first set of P/E cycles 710 and then wait for a duration equal to the predetermined relaxation time delay 701 before becoming active and executing a second set of P/E cycles 711. During the relaxation time delay, the programming errors introduced by the P/E cycles are corrected by the retention errors and at the end of the relaxation time delay, the BER of Pool A is at a minimum. This process repeats during operation of nonvolatile memory system 300, with a relaxation time delay A 701 following each set of P/E cycles 710-712. Similarly, the NAND memory blocks of Pool B execute a first set of P/E cycles 720 and then wait for a duration equal to the predetermined relaxation time delay B 702 before becoming active and executing a second set of P/E cycles 721 and the process repeating during operation of nonvolatile memory system 300, with a relaxation time delay 702 following each set of P/E cycles 720-722. In the same manner, the NAND memory blocks of Pool C execute a first set of P/E cycles 730 and then wait for a duration equal to the predetermined relaxation time delay C 703 before becoming active and executing a second set of P/E cycles 731 and the process repeating during operation of nonvolatile memory system 300, with a relaxation time delay 703 following each set of P/E cycles 730-731.

When Pool A, Pool B or Pool C becomes active, the predetermined number (x) of P/E cycles could be performed at a maximum program/erase speed of the device.

In the embodiment shown in FIG. 3, program/erase module 330 is operable to perform program and erase operations and is operable to count the total number of program operations and erase operations performed during each active cycle 710-713, 720-723 and 730-733. Program/erase module 330 is operable to become inactive and stop performing program and erase operations each time that the total number of program and erase operations performed during a particular cycle equals a predetermined number (x) of program and erase cycles. In the present embodiment, the predetermined number of program and erase cycles is 10,000 and program/erase module 330 is operable to perform program and erase operations until the total number of program and erase operations reaches 10,000.

In one embodiment the predetermined number (x) of program and erase cycles for each of the plurality of memory block pools is determined experimentally and is stored in nonvolatile memory controller 310 prior to assembly of nonvolatile memory system 300; and nonvolatile memory controller 310 is programmable such that each vendor can change the stored predetermined number of program and erase cycles to conform to the characteristics of NAND chips 350. In the present example, the predetermined number of program and erase cycles is 10,000 for all of pools A, B and C such that 10,000 P/E operations are performed in each of cycles 710-712, 720-722 and 730-731. However, alternatively, pools A, B and C could each have a different number of program and erase cycles performed during each active cycle.

In the embodiment shown in FIG. 3 memory block pool wear leveling module 320 includes time circuitry for measuring the time following each cycle 710-712, 720-722, 730-731 (measured pool relaxation time) and comparing the measured pool relaxation time to the relaxation time delay for the particular pool, with memory block pool wear leveling module 320 operable to start the next cycle of a pool when the measured pool relaxation time is equal to the relaxation time delay for the particular pool. More particularly, memory block pool wear leveling module 320 is configured to measure the time following cycle 710 (measured pool relaxation time) and comparing the measured pool relaxation time to the relaxation time delay for pool A 701, and is operable to start the next cycle of pool A 711 when the measured pool relaxation time is equal to the relaxation time delay for pool A 701. Similarly, memory block pool wear leveling module 320 is configured to measure the time following cycle 720 (measured pool relaxation time) and comparing the measured pool relaxation time to the relaxation time delay for pool B 702, and is operable to start the next cycle of pool B 721 when the measured pool relaxation time is equal to the relaxation time delay for pool B 702. Memory block pool wear leveling module 320 is configured to measure the time following cycle 730 and start cycles of pool C in the same manner as for pools A and B.

In the present embodiment, data is only stored in an active data pool, and data is not stored in a data pool that is not active. For example, data received during active periods 710-712 may be stored in pool A, data received during active periods 720-722 may be stored in pool B, data received during active periods 730-731 may be stored in pool C. As there is no programming during the relaxation time delay for each pool, data received during relaxation time delay A 701 is not stored in pool A, data received during relaxation time delay B 702 is not stored in pool B and data received during relaxation time delay C 703 is not stored in pool C. In the present embodiment data read operations are performed as required, with any of the blocks of pools A, B or C being read as required.

It is appreciated that the duration of cycles 710-712, 720-722 and 730-732 will vary when reads are performed during a respective cycle. In the present embodiment the initial cycles are staggered so as to assure that at least one pool is active at all times. In one embodiment, if data to be stored is received at a time when no pool is active, the pool having the greatest time measurement is made active to allow for storing the incoming data.

The memory block pool wear-leveling module 320 and the program/erase module 330 may also be configured to integrate standard wear-leveling techniques into the memory block pool wear-leveling technique. Standard wear-leveling techniques can be incorporated into the individual memory block pools by evenly distributing the execution of the predetermined number of program/erase cycles among the plurality of blocks of each of memory block pools A, B and C. Alternatively, standard wear leveling could be performed by distributing the predetermined number of program/erase cycles between a different set of pools.

FIG. 8 illustrates the BER for a standard wear-leveling leveling technique as compared to the BER using the relaxation time delay and memory block pools in accordance with the present invention. As shown in FIG. 8, for the nonvolatile memory device using both the standard wear-leveling technique known in the art, which delays the P/E erase cycles for all the memory blocks evenly 800, and the method of the present invention using a relaxation time delay and memory block pools 805, 810 the BER increases for both methods as the number of P/E cycles increases. In this exemplary embodiment, results are shown for a first relaxation time delay 805 and a second relaxation time delay 810, wherein the second relaxation time delay 810 results in a slightly lower BER than the second relaxation time delay 805. However, as illustrated in FIG. 6, the BER at 10K P/E cycles utilizing the memory block pools and the first relaxation time delay 805 and the second relaxation time delay 810 are both two orders of magnitude lower than the standard wear-leveling technique 800. Accordingly, the utilization of memory block pools and the associated relaxation time delay in accordance with the present invention greatly reduces the BER of the nonvolatile memory storage device over the lifetime of the device.

Figure 10:
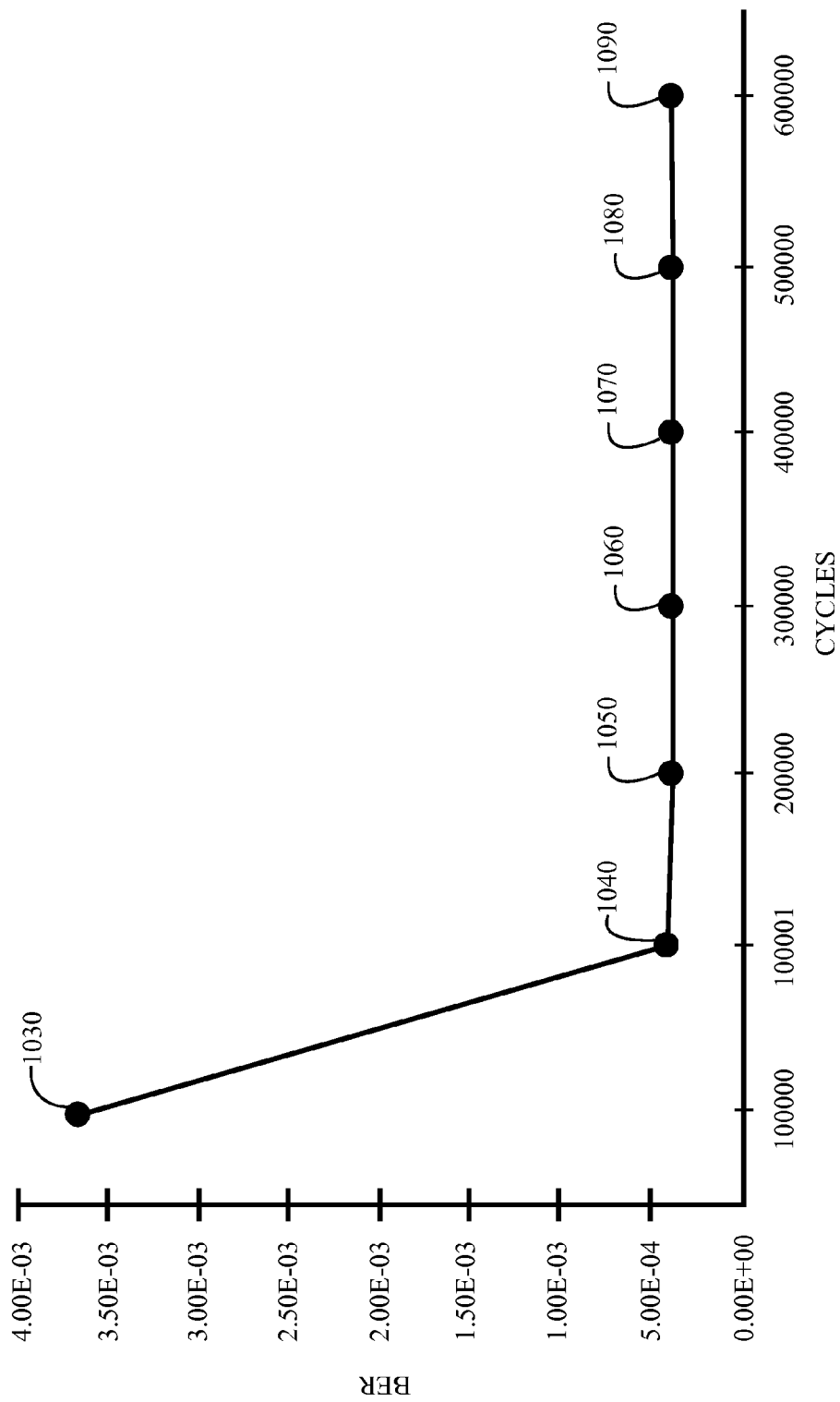
FIG. 10 is a graphical illustration of the BER relative to erase stress of block 1026 when P/E cycles are separated by a relaxation time delay in accordance with an embodiment of the present invention.

It would not be desirable for the P/E cycling of an active memory block pool to increase the BER of another memory block pool that is operating in a retention state. FIG. 10 illustrates the BER relative to the P/E cycling (erase stress) of the active memory block pool for an exemplary memory block. With reference to FIG. 10, the BER of an average memory block, such as memory block 1026, was monitored during the P/E cycling of other nearby memory blocks 1028, 1030, 1032 1034 and 1036. In this exemplary embodiment, the BER of memory block 1026 was measured after 100K P/E cycles 1030 and then the BER was measured again after the data was retained in memory block 1026 for a retention delay of 4 hours at 110° C. 1040. As the other memory blocks were cycled for 100K P/E cycles each, the BER of memory block 1026 was measured at 100K increments, while operating in a retention state, up to 600K P/E cycles. More particularly, measurement 1050 was performed after 100K cycles of memory block 1028. Then, after cycling memory block 1030 for 100K P/E cycles a measurement 1060 was taken, followed by cycling memory block 1032 for 100K P/E cycles and taking measurement 1070. Memory block 1034 was then cycled for 100K P/E cycles and measurement 1080 was taken, followed by cycling memory block 1036 for 100K P/E cycles and measurement 1090. As shown in FIG. 10, there was no significant impact of the P/E cycling (erase stress) of the other memory blocks on memory block 1026 when memory block 1026 was operating in a retention state.

Figure 11:
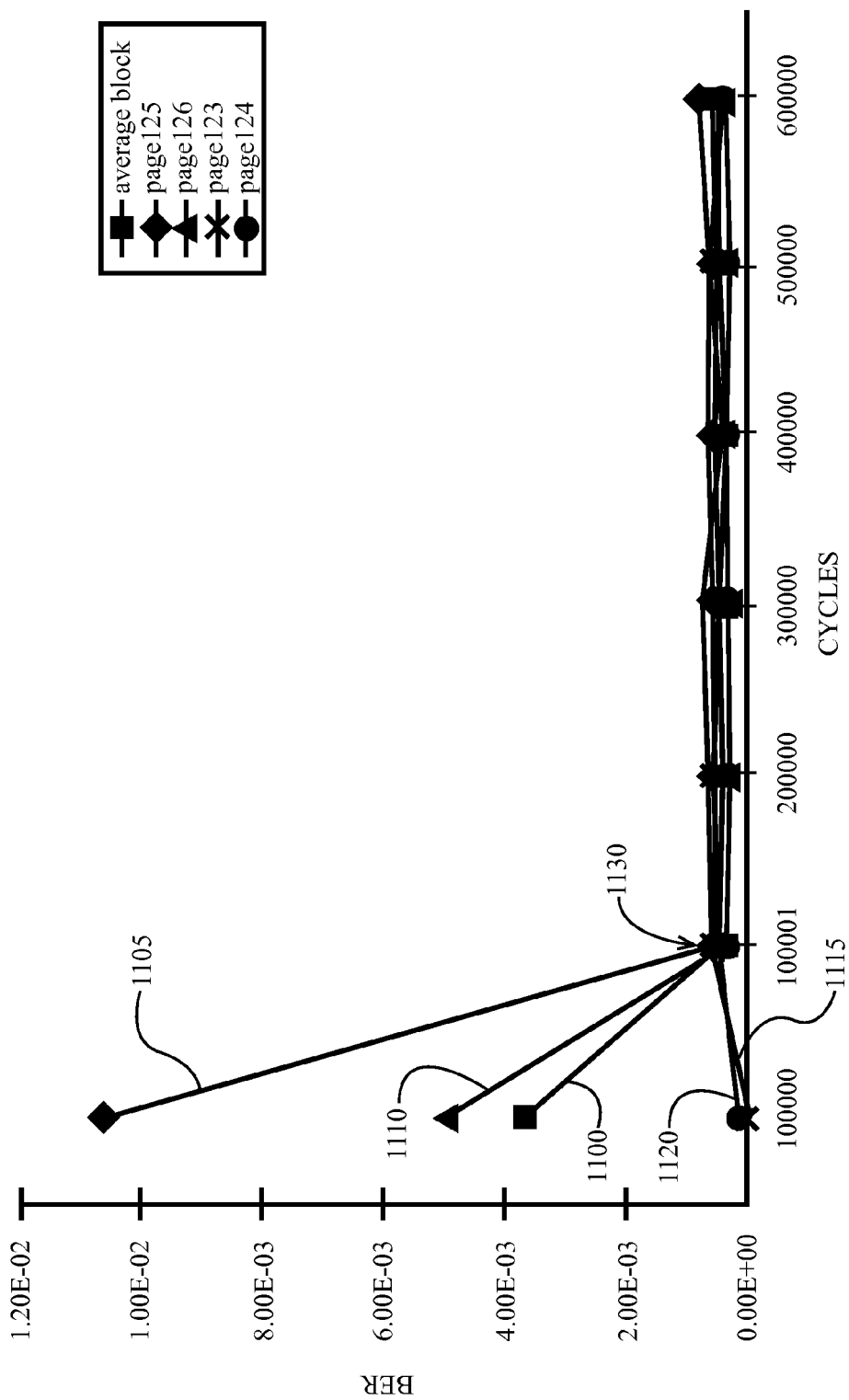
FIG. 11 is a graphical illustration of the BER relative to erase stress of block 1026 and the page index when P/E cycles are separated by a relaxation time delay in accordance with an embodiment of the present invention.

FIG. 11 illustrates the BER of an average memory block, such as block 1026 1100, as a function of the erase stress (P/E cycling) relative to the page index for page 125 1105, page 126 1110, page 123 1115, and page 124 1120. In this exemplary embodiment, the BER of memory block 1026 was measured after 100K P/E cycles and then the BER was measured again after the data was retained in memory block 1026 for a retention delay of 4 hours at 110° C. Then, cycles of nearby memory blocks were performed in the same manner as discussed with respect to FIG. 8, with each cycle followed by a measurement. More particularly, measurements were performed after 100K P/E cycles of memory block 1028 (at 200K P/E cycles) followed by measurements performed after 100K P/E cycles of memory block 1030 (at 300K P/E cycles), followed by measurements performed after 100K cycles of memory block 1032 (at 400K P/E cycles), and measurements performed after 100K P/E cycles of memory block 1034 (at 500K P/E cycles) and measurements performed after 100K P/E cycles of memory block 1036 (at 600K P/E cycles). As shown, all of the pages converge at 1130 after a retention delay of 4 hours at 110° C. and the P/E cycles being executed on the other blocks does not cause a significant change in the average BER of the memory block 1026 that is experiencing retention.

The memory block pool technique of the present invention exploits the relaxation phase to minimize the BER for the nonvolatile memory storage module. Using the end of the relaxation phase is a trade-off among relaxation, retention, SSD capacity and program throughput. With the standard wear-leveling approach, the BER continues to increase as the number of P/E cycles increases. In contrast, in the present invention, a leveling-off of the BER is achieved as the number of P/E cycles increases using the memory block pool and associated relaxation time of the present invention. This leveling-off effect has been shown to allow an increase in P/E cycling from 60K to 1 M cycles, while still maintaining an acceptable BER of the device.

In various embodiments, the system of the present invention may be implemented in a Field Programmable Gate Array (FPGA) or Application Specific Integrated Circuit (ASIC).

Though the method and apparatus of the present invention is described above with respect to a single level memory cell, it is within the scope of the present invention to extend the methods and apparatus of the present invention to MLC (multiple-level cell) devices, as would be evident to one of skill in the art.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A method for memory block pool wear leveling in a nonvolatile memory system, the method comprising: identifying a plurality of memory block pools of the nonvolatile memory system, each of the memory block pools comprising a plurality of memory blocks and each of the plurality of memory blocks comprising a plurality of memory cells; identifying a relaxation time delay for each of the plurality of memory block pools, wherein the relaxation time delay for each of the plurality of memory block pools is identified as a duration of time between a completion of a programming cycle of the memory block pool and a point in time when BER (bit error rate) of the memory block pool is at a minimum; and executing a predetermined number of program/erase cycles for each of the plurality of memory block pools based upon the relaxation time delay of each of the plurality of memory block pools.

2. The method of claim 1, wherein the relaxation time delay for each of the plurality of memory block pools of the nonvolatile memory device is equivalent.

3. The method of claim 1, wherein the identifying of the relaxation time delay for each of the plurality of memory block pools further comprises programming the plurality of memory blocks of each of the plurality of memory block pools in a first pattern, reading the programmed memory blocks to identify errors, and identifying the relaxation time delay for each of the memory block pools as the end of a relaxation phase for the memory blocks in the respective memory block pool.

4. The method of claim 1, wherein executing the predetermined number of program/erase cycles for each of the plurality of memory block pools based upon the relaxation time delay of each of the plurality of memory block pools further comprises, evenly distributing the execution of the predetermined number of program/erase cycles among the plurality of blocks of the memory block pool.

5. The method of claim 1, wherein identifying the plurality of memory block pools of the nonvolatile memory system further comprises randomly identifying the plurality of memory blocks for each of the plurality of memory blocks pools.

6. The method of claim 1, wherein identifying the plurality of memory block pools of the nonvolatile memory system further comprises: identifying the BER (bit error rate) for each of the plurality of memory blocks; and identifying each of the plurality of memory blocks as belonging to one of the plurality of memory block pools based upon the BER of the memory block.

7. The method of claim 1, wherein the identifying the relaxation time delay for each of the plurality of memory block pools further comprises: programming the plurality of memory blocks of one or more of the plurality of memory block pools in a one or more patterns, reading the programmed memory blocks to identify errors, and identifying the relaxation time delay for each of the memory block pools using a retention time corresponding to the end of the relaxation phase of each of the one or more patterns.

8. The method of claim 7, wherein the identifying the relaxation time delay for each of the plurality of memory block pools further comprises identifying the relaxation time delay that is greater than or equal to the lowest retention time of the retention time corresponding to the end of the relaxation phase of each of the one or more patterns and less than or equal to the highest retention time of the retention time corresponding to the end of the relaxation phase of each of the one or more patterns.

9. A nonvolatile memory controller for memory block pool wear leveling in a nonvolatile memory device, the nonvolatile memory controller comprising: a memory block pool wear leveling module configured for identifying a plurality of memory block pools of the nonvolatile memory device and for identifying a relaxation time delay for each of the plurality of memory block pools; and a program/erase module coupled to the memory block pool wear leveling module, the program/erase module configured for executing a predetermined number of program/erase cycles for each of the plurality of memory block pools based upon the relaxation time delay of each of the plurality of memory block pools; wherein the relaxation time delay for each of the plurality of memory block pools is identified as a duration of time between a completion of a programming cycle of the memory block pool and a point in time when BER (bit error rate) of the memory block pool is at a minimum.

10. The controller of claim 9, wherein the relaxation time delay for each of the plurality of memory block pools of the nonvolatile memory device is equivalent.

11. The controller of claim 9, wherein the relaxation time delay is a time that is within a relaxation phase for a nonvolatile memory device.

12. The controller of claim 9, wherein the predetermined number of program/erase cycles for each of the plurality of memory block pools is equivalent.

13. The controller of claim 9, wherein executing the predetermined number of program/erase cycles for each of the plurality of memory block pools based upon the relaxation time delay of each of the plurality of memory block pools further comprises, evenly distributing the execution of the predetermined number of program/erase cycles among a plurality of blocks for each of the plurality of memory block pools.

14. The controller of claim 9, wherein the memory block pool wear leveling module is further configured for randomly identifying a plurality of memory blocks for each of the plurality of memory blocks pools.

15. The controller of claim 9, wherein the memory block pool wear leveling module is further configured for identifying the bit error rate (BER) for each of a plurality of memory blocks and for identifying each of the plurality of memory blocks as belonging to one of the plurality of memory block pools based upon the bit error rate of the memory block.

16. The controller of claim 9, wherein the memory block pool wear leveling module is configured for programming a plurality of memory blocks of each of the plurality of memory block pools in one or more patterns, reading the programmed memory blocks to identify errors, and identifying the relaxation time delay for each of the memory block pools using a retention time corresponding to the end of a relaxation phase of each of the one or more patterns.

17. A nonvolatile memory system for memory block pool wear leveling in a nonvolatile memory device, the nonvolatile memory system comprising: a nonvolatile memory storage module; and a nonvolatile memory controller coupled to the nonvolatile memory storage module, the nonvolatile memory controller comprising: a memory block pool wear leveling module configured for identifying a plurality of memory block pools of the nonvolatile memory system and for identifying a relaxation time delay for each of the plurality of memory block pools; and a program/erase module coupled to the memory block pool wear leveling module, the program/erase module configured for executing a predetermined number of program/erase cycles for each of the plurality of memory block pools based upon the relaxation time delay of each of the plurality of memory block pools; wherein the relaxation time delay for each of the plurality of memory block pools is identified as a duration of time between a completion of a programming cycle of the memory block pool and a point in time when BER (bit error rate) of the memory block pool is at a minimum.

18. The nonvolatile memory system of claim 17 wherein the identified relaxation time delay for each pool is less than or equal to a retention time at which data retention has resulted in a transition of the same number of cells from an erased state to a programmed state as have transitioned from a programmed state to an erased state for one or more test pattern.

19. The nonvolatile memory system of claim 17, wherein the relaxation time delay is a time that is within a relaxation phase for one or more nonvolatile memory device in the nonvolatile memory storage module.

20. The nonvolatile memory system of claim 17, wherein the relaxation time delay is a time that is within the last forty percent of a relaxation phase for one or more nonvolatile memory device in the nonvolatile memory storage module.

21. The nonvolatile memory system of claim 17, wherein the memory block pool wear leveling module is configured for programming a plurality of memory blocks of each of the plurality of memory block pools in one or more patterns, reading the programmed memory blocks to identify errors, and identifying the relaxation time delay for each of the memory block pools using a retention time corresponding to the end of a relaxation phase of each of the one or more patterns.

* * * * *